United States Patent
Meier et al.

(10) Patent No.: US 8,146,157 B2
(45) Date of Patent: Mar. 27, 2012

(54) METHOD AND APPARATUS FOR SECURE TRANSPORT AND STORAGE OF SURVEILLANCE VIDEO

(75) Inventors: Rolf Meier, Carp (CA); Guy Duxbury, Nepean (CA)

(73) Assignee: Rockstar Bidco, LP, New York, NY (US)

( * ) Notice: Subject to any disclaimer, the term of this patent is extended or adjusted under 35 U.S.C. 154(b) by 1743 days.

(21) Appl. No.: 11/311,102

(22) Filed: Dec. 19, 2005

(65) Prior Publication Data
US 2007/0140487 A1    Jun. 21, 2007

(51) Int. Cl.
*H04L 29/06*    (2006.01)
(52) U.S. Cl. .......................................... 726/22; 713/178
(58) Field of Classification Search .................... 380/36, 380/255
See application file for complete search history.

(56) References Cited

U.S. PATENT DOCUMENTS

| | | | |
|---|---|---|---|
| 5,229,850 A | 7/1993 | Toyoshima | |
| 5,546,072 A | 8/1996 | Creuseremee et al. | |
| 5,943,321 A | 8/1999 | St-Hilaire | |
| 6,069,655 A | 5/2000 | Seeley | |
| 6,122,005 A | 9/2000 | Sasaki et al. | |
| 6,271,752 B1 | 8/2001 | Vaios | |
| 6,516,192 B1 | 2/2003 | Spaur et al. | |
| 6,698,021 B1 * | 2/2004 | Amini et al. | 725/105 |
| 7,133,368 B2 * | 11/2006 | Zhang et al. | 370/249 |
| 7,254,249 B2 * | 8/2007 | Rhoads et al. | 382/100 |
| 2001/0024233 A1 | 9/2001 | Urisaka et al. | |
| 2002/0129290 A1 * | 9/2002 | Couillard | 713/400 |
| 2008/0250147 A1 * | 10/2008 | Knibbeler et al. | 709/229 |

* cited by examiner

*Primary Examiner* — Gilberto Barron, Jr.
*Assistant Examiner* — Simon Kanaan
(74) *Attorney, Agent, or Firm* — Withrow & Terranova, PLLC

(57) ABSTRACT

Security information such as fixed or dynamically received camera location information, laser signature information, timestamp information, and network information, may be used to secure the transport and storage of surveillance video. Where the surveillance video is to be transported on a communication network, the round trip time from a video data storage server to the surveillance camera and back to the video data storage server may be monitored and periodically added to the secured video data. By checking to see whether the round trip time has changed, it may be possible to determine whether the video has been tampered with. The secured video data may also be transported over two or more paths on the network to two or more video data storage servers so that redundant copies may be stored at different primary locations. By comparing copies of the data, alteration of one of the copies may be detected.

20 Claims, 2 Drawing Sheets

METHOD AND APPARATUS FOR SECURE TRANSPORT AND STORAGE OF SURVEILLANCE VIDEO

BACKGROUND OF THE INVENTION

1. Field of the Invention

The present invention relates to video surveillance and, more particularly, to a method and apparatus for secure transport and storage of surveillance video.

2. Description of the Related Art

Surveillance cameras are being deployed, often connected via a communication network, to monitor buildings, streets, public transportation, and other public and private areas. One goal of using surveillance cameras is to capture a video representation of events occurring at a particular time so that, if a crime is committed, the video data of the crime may be reviewed to learn the identity of the criminal. Where the video data is sufficiently authenticated, the video data may also be introduced in a court of law to help convict the criminal of the crime.

Unfortunately, it is possible to tamper with video data to change the content of the video data and, accordingly, video data is not necessarily sufficiently trustworthy to be introduced as evidence in court. To increase the reliability of video data to help ensure that the video data has not been tampered with, methods have been developed that enable authentication information to be added to the video data. For example, timestamps and digital signatures are commonly applied to video data to provide information about when the video data was created and to help detect tampering. Additionally, fragile and permanent watermarks (also called fingerprints) may be used to detect tampering. However, all of these techniques may be overcome by a person with specialized knowledge of the manner in which the authentication information was added and a desired to do so. Accordingly, it would be advantageous to provide a new way of transporting and storing surveillance video that could increase the authentication level of the surveillance video data to make it more difficult to alter the content of the video data and, hence to make it more likely to be found trustable at a later point in time.

SUMMARY OF THE INVENTION

A method and apparatus for increasing the authentication level of surveillance video data is disclosed in which security information such as an indication of the location of the camera that took the surveillance video data is added to the surveillance video data to create secured video data. This allows the location information to be used to verify where the data originated so that if the location information present on the stored secured video data does not match the expected location information, tampering may be suspected. Optionally, the location information that is added to the secured video data may be encrypted and/or encoded using an encoding algorithm configured to incorporate a time-varying code known only to the video storage server, so that the location information may be authenticated as having been added by the camera at that location at the particular time.

Additionally, since the video is to be transported over the network, the round trip time from a video data storage server to the surveillance camera and back to the video data storage server may be monitored and periodically added to the secured video data. By checking to see whether the round trip time has changed, it may be possible to determine whether the video has been tampered with. Optionally, round trip time monitoring may be performed in real time and an alarm may be generated where the round trip time changes in a manner that is not explained by the network.

Finally, the secured video data, according to an embodiment of the invention, may be multicast on the network to two or more video data storage servers so that redundant copies may be stored. A comparison between the copies may then be used to determine whether the several copies of the secured video data are the same or have another expected relationship. Other ways of increasing the authenticity level may be used as well and the invention is not limited to the use of only one or a particular combination of these security methods.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

According to an embodiment of the invention, physical location information and time stamp information may be added to surveillance video data so that the time and location of the camera at the time the secured video data was created may be obtained from the secured video data. Additionally, round trip time information or other network information may be added to verify the path the data took over the network. Optionally, multiple copies of the secured video data or the security information that was added to the secured video data may be stored at different locations so that tampering may be detected if someone later attempts to alter the secured video data.

Figure 1:
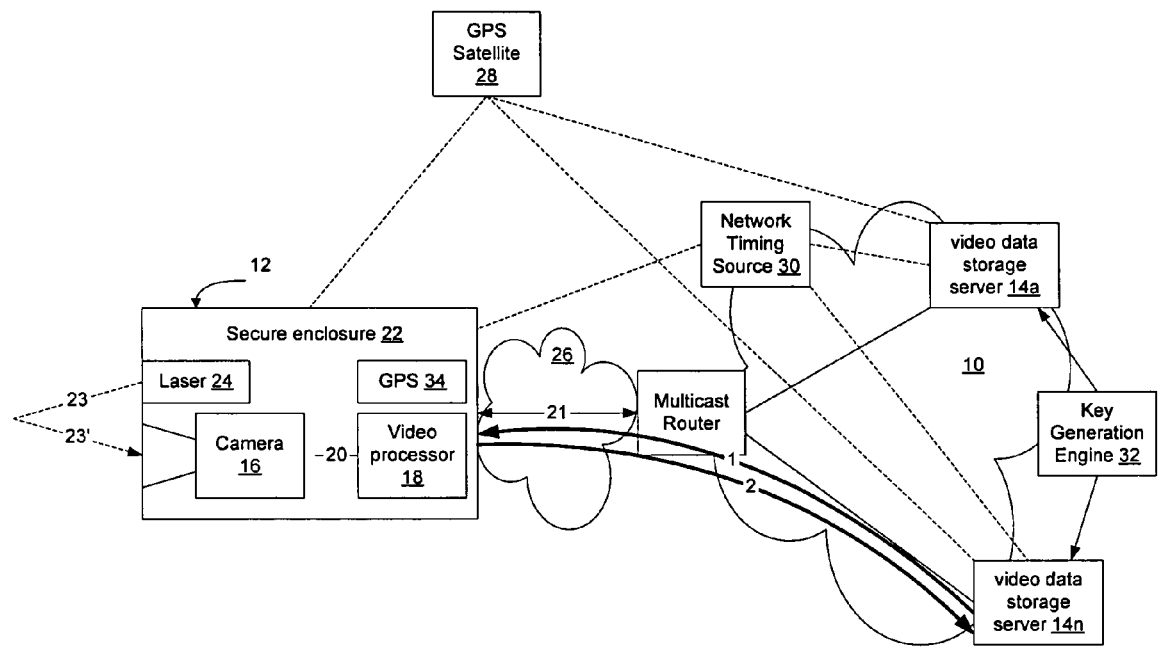
FIG. 1 is a functional block diagram of an example communication network over which an embodiment of the invention may operate.

FIG. 1 shows a network over which an embodiment of the invention may operate. In the embodiment shown in FIG. 1, a communication network 10 is used to transport secured video data 21 from a secured video data source 12 to one or more video data storage servers 14. The secured video data source 12 includes a camera 16 configured to output a digitized video stream. The video stream may be a sequence of still photos or may be a motion picture video stream. The camera may include one or more lenses, CCD arrays, A/D converters, and other conventional components configured to enable digital video signals to be produced that are representative of the environment surrounding the camera. Surveillance cameras are well known in the art and the invention is not limited to the use of a particular surveillance camera or particular type of surveillance camera.

The secured video data source 12 may also include a video processor 18 configured to perform one or more operations on the video stream 20 output from the camera 16. The video processor 18 is configured, in this embodiment, to process the video stream 20 by adding security information to the video stream 20 as discussed in greater detail below to produce the secured video data 21. For example, the processor may add time stamp information, location information, round trip time information associated with a network path between the secured video data source 12 and the video data storage server 14 on the network, and other information. Additionally, one or more of these aspects may be encrypted using keys exchanged according to an encryption protocol, or may include a time varying component such that even if the encryption aspect were broken, the underlying value may only be extracted if a randomized time-varying number is known as well. The manner in which the data is processed will be described in greater detail below. The video processor 18, according to an embodiment of the invention, is configured to implement these processes to encode the video stream 20 from the camera 16 to create secured video data 21.

The camera 16 and processor 18 are maintained in a secure enclosure 22, such as a FIPS (Federal Information Processing Standard) enclosure. The secure enclosure 22 prevents the components such as camera 16 and video processor 18 from being tampered with physically, so that a person intent on circumventing the security camera 16 may not tamper with the camera 16 or the processor 18 without being detected. Although in this embodiment the camera 16 and processor 18 are shown as separate elements, these two elements may be combined into a single element. For example, the camera 16 may be provided with sufficient capabilities to perform the operations described herein to output the secured video data 21 directly. Other manners of configuring the components may be used as well and the invention is not limited to a particular choice of where the security information is added to create the secured video data 21.

Optionally the secure enclosure 22 may include a laser 24 or other light source configured to paint a specific signature onto the environment that can be captured and natively included as part of the video stream 20 output by the camera. For example, as shown in FIG. 1, the laser may output a beam of light 23 in the visible or invisible spectrum, the reflection of which (23') may be captured by the camera 16. The direction in which the light 23 is output may be constant or may be caused to vary over time according to a particular pattern. Adding the self-generated light to the video stream 20 captured by the camera 16 enables an encoded signature to be added directly to the video pixel image data, which will be harder to duplicate if an attempt is made to alter the video stream 20 or secured video data 21.

Secured video data 21 is passed across an access medium 26 and multicast or otherwise transmitted across communication network 10 to the video data storage server(s) 14. The access medium may be any conventional access medium. For example, the access medium may be formed using one or more of the wireless transmission technologies, such as 802.11, 802.16, cellular, or other wireless networking technologies. Alternatively, the access medium may be formed from a wire-based technology, such as one of the Digital Subscriber Line (xDSL) technologies configured to operate over telephone lines, optical signals configured to run over optical fibers, or a transmission technology configured for use over television cables. The invention is not limited to the particular technology used to interconnect the secured video data source 12 with the communication network 10. Additionally, where more than one secured video data source 12 is being used, different access technologies may be used to connect the different secured video data sources 12 to the communication network 10 if desired.

The secured video data 21 is transmitted to the communication network and multicast or unicast over different network paths to multiple video data storage servers 14. The multiple video data storage servers 14 may be located in the same physical location, e.g., in a common room, or may be located in different facilities. Standard multicasting techniques and unicasting techniques may be used to transmit the data on the network. Optionally, the secured video data signals 21 may be streamed across the network. The invention is not limited to the particular manner in which the secured video data signals are transported on the network 10 to the video data storage servers.

In one embodiment of the invention, the secured video data is stored at a single storage location. In another embodiment of the invention, the secured video data is stored at redundant locations to enable different copies of the secured video data to be stored in different places. If necessary, the different copies of the secured video data may then be compared to determine if one or more of the copies has been altered. In a third embodiment, the security information that is added to the video stream 20 to form the secured video data may be stored in one location apart from the secured video data, and the secured video data (with the added security information) may be stored in another storage location. This embodiment enables the security information to be verified at a later date without requiring a complete duplicate of the secured video data to be stored. Optionally, in this third embodiment, a color density histogram or other picture quality matrix may be taken and stored along with the security information so that a validity check may be performed at a later date to see if the video information contained in the secured video data has been altered since it was initially generated by the camera 16. An advantage of this third embodiment is that the video is not being stored in two places, thus reducing the amount of video information that needs to be transported on the network and the storage space required to store the secured video data.

In each of these embodiments, the storage location may be a temporary storage location or may be a permanent or semi-permanent storage location. For example, the storage location may buffer secured video data for a few minutes while security personnel view the data in real time. If there is a reason to store the data more permanently, the data may then be passed to a longer-term storage facility. Alternatively, the storage location may store the data for a few days to enable the secured video data to be available if a crime or other occurrence is discovered that requires access to archived secured video data. Still alternatively, the storage location may be configured to store the secured video data for months or years depending on the likelihood that the secured video data will be relevant or of importance at that later point in time. The invention is not limited to the particular length of time the secured video data is stored as the particular amount of time the data is stored will depend on the particular use to which the system is being placed and the likely anticipated relevance of the data being captured by the camera at that later point in time. Optionally, each video data storage server 14 may be connected to backup facilities so that redundant copies may be made/kept by the local networks associated with the video data storage servers 14. The use of different storage locations, in this embodiment, is thus different than the use of a single storage location with offsite backup storage.

A GPS (Global Positioning System) satellite 28 may be used to convey GPS location signals to the secured video data source 12, and optionally may also be used to convey timing information to the secured video data source. Alternatively, the secured video data source may be connected to a network timing source 30 such as a NIST (National Institute of Standards and Technology) broadcast signal or another timing source such as a Simple Network Time Protocol (SNTP) server. The invention is not limited to the particular way the secured video data source 12 is provided with a timing signal. Additionally, where GPS position information is to be used in connection with preparing security information to create the secure secured video data, the GPS position information may be read in real time and added to the video stream or may be programmed into the secured video data source 12 when the secured video data source 12 is installed. For stationary cameras that are mounted at a fixed location, the use of programmed position information rather than dynamically determined position information may enable the secured video data source 12 to be implemented in a less costly fashion. Specifically, the secured video data source 12 may be implemented without requiring the use of a GPS receiver, which may make the secured video data source 12 more economical to manufacture. To enable the secured video data source 12 to withstand power outages, the position information and other information may be stored in non-volatile memory.

A key generation engine 32 may be provided on the network or associated with one or more of the video data storage servers 14. The key generation engine 32 may be configured to generate secure keys for use in connection with encrypting the secured video data, time stamp and other security information associated with the secured video data, and for use in connection with other aspects of the surveillance system described herein. Multiple different key generation engines are available, and many different ways of using keys to encrypt data are known in the art, and the invention is not limited to the use of any particular key generation engine or encryption/securing process.

According to an embodiment of the invention, a video data storage server 14 transmits an encrypted time stamp to the secured video data source (arrow 1) which then returns the message to the server with its own time stamp and the original server time stamp (arrow 2). The secured video data source may decrypt the encrypted time stamp before adding its own timestamp or may simply add its own encrypted timestamp. The exchange of timestamps may be separate from the transmission of secured video data or, optionally, the encrypted timestamps may be included in the secured video data output from the secured video data source. This procedure may be carried out periodically, for example every 10 seconds, so that the round trip time from the video data storage server 14 to the secured video data source 12 may be calculated and trended. Where more than one video data storage server is used to store the secured video data, the source of the time stamps may alternate between the video data storage servers or may be determined randomly or according to another pattern.

Having the round trip time available and optionally included as part of the secured video data 21 may provide an indication as to the path through the network, so that it is possible to determine whether the secured video data source 12 remained stationary or was moved, e.g. by causing the original source to stop sending secured video data and to cause a new rogue source to start sending fake secured video data. Specifically, using this process the round trip delay as well as the 1 way trip delays through the network may be effectively characterized over a period of time. The timestamp information may then be stored together with the video stream as part of the picture information, such as a watermark. Interception of the secured video data, tampering with the secured video data such as by decrypting altering and re-encrypting the secured video data, or replacing the original secured video data with modified secured video data, may be likely to cause a difference in the round trip time and/or one-way trip time which may be detected by reviewing the RTT information associated with the secured video data.

Although the invention has been describe herein as pertaining to secured video data, the same techniques may be applied to data streams that are not surveillance data. The watermark format may be derived from a unique identifier associated with the particular camera, such as the MAC address of the secured video data source or a parameter generated at one or more of the storage locations. The invention is thus not limited to the particular example provided as many additional features may be added to the particular types of information that is added to the secured video data to secure it against tampering.

Figure 2:
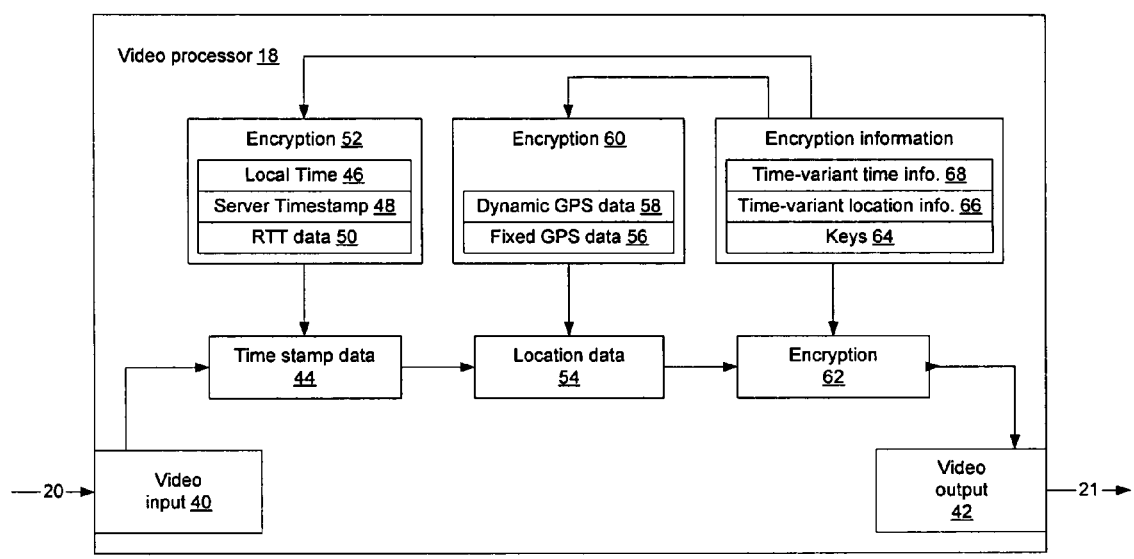
FIG. 2 is a functional block diagram of a video processor for use in a secured video data source according to an embodiment of the invention.

FIG. 2 illustrates an embodiment of a video processor 18 that may be used to implement an embodiment of the invention. As shown in FIG. 2, the video processor 18 is configured to receive the video stream 20 from the camera 16 at a video input 40, process the video stream to add security information to the video stream, and output secured video data 21 at a video output 42.

The video processor may perform multiple operations on the video data as it passes through the video processor. For example, the video processor may add time stamp data 44 to the video stream. The timestamp data may include the local time 46, the latest server timestamp 48 received over the network 10 from one of the video data storage servers 14, and other information 50 configured to enable the round trip time to be calculated on the network. Optionally, one or more aspects of the time stamp data 44 may be encrypted 52 before being added to the video stream. A random delay or time varying delay may be added to any of the time related information to make it more difficult to replicate the time stamp information should a person attempt to tamper with the SVD.

The video processor may also add location data 54 to the video stream. For example, the video processor may add fixed GPS data 56 or other location specific information that has been programmed into SVD source 12, or may include dynamically received GPS data 58, for example where the SVD source includes a GPS receiver 34. Optionally, the location information may be encrypted 60 prior to being added to the video data so that the location data may be more difficult to decipher and extract from the SVD data.

The video data itself, alone or in combination with the location data 44 and/or timestamp data 54, may be encrypted 62. Encryption 62, addition of timestamp data 44 and addition of location data 54 may occur in any desired order and the invention is not limited to an embodiment that follows the order illustrated in FIG. 2.

The video processor 18 may include keys 64, time-variant location information 66, and time-variant time information 68 for use in connection with creation of the timestamp data 44, location data 54, and for use in connection with encryption 52, 60, 62. For example, where the video processor includes time-variant time data 68, the video processor may generate a time-variant offset to be added to the local time. By adding a device specific offset that varies in a particular manner that is known to the video data storage server 14, the timestamps are more difficult to replicate by a person intent on altering the content of the video data that forms the basis of the SVD. Similarly, if a location information offset is used to alter somewhat the absolute position information received from the GPS, a person intent on altering the content of the video will have a harder time replicating the location information. Where the location offset varies in a manner known to the video data storage server, replication may be even more difficult.

Accordingly, the video processor, in this embodiment, is configured to encode a video stream 20 to add security information, and optionally to encrypt the video stream, to output secure video data 21. The secure video data 21 may then be transported to one or more video data storage servers 14 as shown in FIG. 1, where it may be stored for future retrieval if necessary. By storing the secure video data 21 in multiple locations, it is harder to modify all of the copies of the data so that it is more likely that a genuine copy of the data will survive an attempt to modify the stored data. By transporting the secure video data across two or more paths on the network, each of which is characterized using the round trip time that it takes to transport a packet from the video data storage server 14 to the secure video data source 12 and back, the paths may be monitored to determine if anyone has attempted to tamper with the data while being transmitted on the network 10. By including security information such as timestamp information, round trip time information, and location information into the video stream, a highly secure video stream may be created that is more difficult to tamper, without the tampering being detectable. Finally, by including a laser signature or other identifiable light source in the image detected by the camera, it becomes more difficult to generate a replacement image for substitution into the secure video data.

The functions described above may be implemented as a set of program instructions that are stored in a computer readable memory associated with video processor 18 or with video data storage server 14, and executed on one or more processors associated with those computer platforms. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of securing video data, the method comprising the steps of:
   transmitting a message including a first timestamp by a video data storage server to a secured video data source; and
   receiving secured video data from the secured video data source, said secured video including information associated with the first timestamp, such that the round trip time from the video data storage server to the secured video data source and back to the video data storage server is calculated, stored along with the secured video data, and used to detect if the secured video data source or secured video data has been tampered with.

2. The method of securing video data of claim 1, wherein the secured video data further comprises location information associated with a location of the secured video data source.

3. The method of claim 1, wherein the secured video data further comprises a second timestamp, said second timestamp being associated with a time the first timestamp was received by the secured video data source.

4. The method of claim 1, wherein the information associated with the first timestamp is encrypted.

5. The method of claim 1, wherein the secured video data is encrypted.

6. The method of claim 1, wherein the secured video data contains time-variant time data and time-variant location information.

7. The method of claim 1, further comprising:
   comparing the round trip time to a reference round trip time; and
   determining whether the secured video data has been tampered with based on the comparing the round trip time to the reference round trip time.

8. A method of using network round trip time information to verify surveillance video, the method comprising the steps of:
   receiving, by a secure video data source, a first timestamp from a video data storage server;
   calculating, by the secure video data source, a second timestamp;
   transmitting the first timestamp and the second timestamp along with video data to the video data storage server to enable the video data storage server to compute the round trip time based on the first timestamp, the second timestamp, and a time of arrival at the video data storage server to enable the secure video data storage server to store the round trip time along with the secured video data so that the round trip time is used to detect if the secured video data source or secured video data has been tampered with.

9. The method of claim 8, further comprising adding first location information to the video data prior to the step of transmitting the first and second timestamps and video data to the video data storage server.

10. The method of claim 9, wherein the first location information comprises fixed location information and a time-variant location offset component.

11. The method of claim 9, wherein the location information is based on global positioning system data.

12. The method of claim 11, wherein the global positioning system data is fixed.

13. The method of claim 11, wherein the global positioning system data is dynamically received.

14. The method of claim 8, further comprising the step of generating coherent light from a laser light source, and wherein the video data comprises a reflection of the coherent light.

15. The method of claim 8, wherein the second timestamp includes a time-variant local time offset.

16. A video processor, comprising:
   a video input configured to receive video data;
   a secured video output configured to output secured video data; and
   control logic configured to add first timestamp information and second timestamp information to the video data, said first timestamp information being associated with a first timestamp received from a video storage server and characteristic of a network path from the video storage server to the video processor, the second timestamp information being associated with a local time at the video processor;

wherein the first timestamp information and second timestamp information enable round trip monitoring to be implemented on the secured video data to enable an alarm to be generated when the round trip time changes in a manner that is not explained by the network.

17. The video processor of claim 16, wherein the control logic is further configured to add first location information to the video data, said first location information comprising global positioning system location information and a time-variant location offset component.

18. The video processor of claim 17, wherein the first location information comprises fixed global positioning system location information.

19. The video processor of claim 16, wherein the control logic is further configured to encrypt the video data.

20. The video processor of claim 16, wherein the control logic is further configured to transmit the first timestamp information and second timestamp information without the video data to a second video storage server.

* * * * *